United States Patent [19]
Awater et al.

[11] Patent Number: 5,862,182
[45] Date of Patent: *Jan. 19, 1999

[54] OFDM DIGITAL COMMUNICATIONS SYSTEM USING COMPLEMENTARY CODES

[75] Inventors: Geert Arnout Awater, Utrecht; Adriaan Kamerman, Nieuwegein; Anjur Sundaresan Krishnakumar, Bussum; Didier J. R. van Nee, De Meern, all of Netherlands

[73] Assignee: Lucent Technologies Inc., Murray Hill, N.J.

[*] Notice: The term of this patent shall not extend beyond the expiration date of Pat. No. 5,841,813.

[21] Appl. No.: 688,574

[22] Filed: Jul. 30, 1996

[51] Int. Cl.$^6$ .................................................. H04L 27/10
[52] U.S. Cl. ...................... 375/279; 375/279; 375/394; 375/242; 370/209
[58] Field of Search .................................... 375/370, 279, 375/209, 240, 214, 251, 200, 329, 373, 242; 370/209, 201; 342/201, 353, 134

[56] References Cited

U.S. PATENT DOCUMENTS

| | | | |
|---|---|---|---|
| 4,353,067 | 10/1982 | Mims | 342/201 |
| 4,434,499 | 2/1984 | Motsch et al. | 375/240 |
| 5,151,702 | 9/1992 | Urkowitz | 342/134 |
| 5,602,833 | 2/1997 | Zehavi | 370/209 |

OTHER PUBLICATIONS

M.J.E. Golay, "Complementary Series", *IRE Transactions on Information Theory*, Apr. 1961, pp. 82–87.

T.A. Wilkinson et al., "Minimisation of the Peak to Mean Evnelope Power ratio of Multicarrier Transmission Schemes by Blocking Coding", *IEEE Vehicular Technology Conf*, Chicago, Jul. 1995, pp. 825–829.

R. L. Frank, "Polyphase Complementary Codes", *IEEE Transactions on Information Theory*, Nov. 1980, vol. IT–26, No. 6, pp. 641–647.

R. Sivaswamy, "Multiphase Complementary Codes", *IEEE Transactions on Information Theory*, Sep. 1978, vol. IT–24, No. 5, pp. 546–552.

*Primary Examiner*—Stephen Chin
*Assistant Examiner*—Shuwang Liu
*Attorney, Agent, or Firm*—Frederick B. Luludis

[57] ABSTRACT

The encoding/transmission of information in an OFDM system is enhanced by using complementary codes. The complementary codes, more particularly, are converted into phase vectors and the resulting phase vectors are then used to modulate respective carrier signals. The modulated result is then transmitted to a receiver which decodes the received signals to recover the encoded information.

13 Claims, 1 Drawing Sheet

OFDM DIGITAL COMMUNICATIONS SYSTEM USING COMPLEMENTARY CODES

FIELD OF THE INVENTION

The invention relates to the modulation of data for transmission in a digital communications system.

BACKGROUND OF THE INVENTION

In a system employing Orthogonal Frequency Division Multiplexing (OFDM), groups of kN bits are typically transmitted simultaneously over N subchannels, with k bits per channel using some form of Quadrature Amplitude Modulation. If N is made large enough at a constant bit rate, then a subchannel may experience minimum intersymbol interference, but may still be subject to narrowband fading. The effect of such fading may be different for each subchannel. Also, when N sinusoidal signals respectively defining the subchannels are summed with the same phase for transmission in an OFDM system, the result creates a peak-to-average power (PAP) ratio that is typically N times larger than the average power level used in the transmission of a single symbol. Because of this, an OFDM transmitter has to use a linear power amplifier having a large "backoff" corresponding to the PAP ratio. Disadvantageously, then, a decrease in efficiency occurs as the PAP ratio increases. This problem is especially acute when OFDM is used in portable devices where power efficiency is a key concern.

SUMMARY OF THE INVENTION

We have recognized that the aforementioned problem may be dealt with using so-called complementary codes that have been modified in accord with particular phase modulation. Specifically, M input phases, e.g., four phases, directly related to input data may be encoded into N, e.g., eight, output phases associated with respective carrier signals, in which a phase shift, $\theta_1$, is applied to a carrier (subchannel) to achieve a low PAP ratio, e.g., 3 dB.

A receiver receiving the transmitted signal demodulates the N carriers and, by using a fast Fourier transform, obtains N vectors respectively defining the N phases and thus the input data. In the event that a number of carrier signals, e.g., three, are lost during the transmission, the input data may still be recovered in accord with an aspect of the invention.

These and other aspects of the invention will be appreciated from the ensuing detailed description when read in conjunction with drawings.

DETAILED DESCRIPTION

In accordance with an illustrative embodiment of the invention, a set or sequence of complimentary codes of a desired length, e.g., a length 8 code, may be generated starting with a so-called kernel of the desired length. One possible kernel for generating codes of length 8 may be, for example, the series {111-111-11}. (The rules for generating a kernel are discussed in the article entitled "Complementary Series", by M. J. E. Golay, published in the IRE Transactions on Information Theory, vol. IT-7, pp. 82–87, April, 1961, which is hereby incorporated by reference.) Once a particular kernel has been selected, then independent phase rotations are applied to the elements (bits) forming the selected kernel. This may be done using a particular transformation comprising, e.g., eight columns, each column having a different group of individual ones of a predetermined number of phases, e.g., four phases, $\phi_1$, $\phi_2$, $\phi_3$ and $\phi_4$, as follows:

| $\phi_1$ | $\phi_1$ | $\phi_1$ | $\phi_1$ | $\phi_1$ | $\phi_1$ | $\phi_1$ | $\phi_1$ |
|---|---|---|---|---|---|---|---|
| $\phi_2$ | 0 | $\phi_2$ | 0 | $\phi_2$ | 0 | $\phi_2$ | 0 |
| $\phi_3$ | $\phi_3$ | 0 | 0 | $\phi_3$ | $\phi_3$ | 0 | 0 |
| $\phi_4$ | $\phi_4$ | $\phi_4$ | $\phi_4$ | 0 | 0 | 0 | 0 |

The phase angles (also referred to herein as constellation symbols or just symbols), $\phi_i$, forming each of the columns are then applied to the elements of the kernel to form a complementary code, as shown by the following expression:

$$c = \{e^{j(\phi_1+\phi_2+\phi_3+\phi_4)}, e^{j(\phi_1+\phi_3+\phi_4)}, e^{j(\phi_1+\phi_2+\phi_4)}, -e^{j(\phi_1+\phi_4)}, e^{j(\phi_1+\phi_2+\phi_3)}, e^{j(\phi_1+\phi_3)}, -e^{j(\phi_1+\phi_2)}, e^{j\phi_1}\} \quad (1)$$

The vectors forming the complementary code may be represented by respective output phases $\theta_1$ through $\theta_8$ and may be formed as illustrated by the following transformation derived in accordance with equation 1:

$\theta_1 = \phi_1 + \phi_2 + \phi_3 + \phi_4$ $\theta_2 = \phi_1 + \phi_3 + \phi_4$ $\theta_3 = \phi_1 + \phi_2 + \phi_4$ $\theta_4 = \phi_1 + \phi_4 + \pi$ $\theta_5 = \phi_1 + \phi_2 + \phi_3$ $\theta_6 = \phi_1 + \phi_3$ $\theta_7 = \phi_1 + \phi_2 + \pi$ $\theta_8 = \phi_1$ The eight phases $\theta_1$ through $\theta_8$ may then be used to respectively modulate eight OFDM subcarriers as is done conventionally in an OFDM system, as discussed below.

Figure 1:
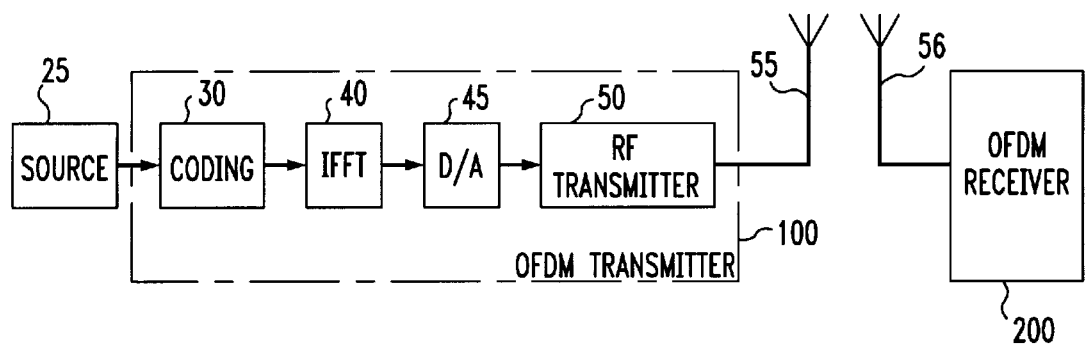
FIG. 1 illustrates in block diagram form a wireless system composed of a transmitter and receiver arranged in accord with the principles of the invention.

Specifically, assume that OFDM transmitter 100, FIG. 1, embodying the principles of our invention receives via encoder circuit 30 a stream of data bits from a source of data bits 25. Encoder circuit 30, which may be, for example, a conventional digital signal processor, partitions the data stream as it is received into successive groups of twelve bits each group and stores each such group as it is formed in internal memory (not shown). Encoder circuit 30 then unloads a group of stored data bits from the internal memory, encodes the data bits in accordance with the principles of the invention and supplies the result to Inverse Fast-Fourier Transform (IFFT) processor 40. Encoder circuit 30, more particularly, first encodes the group of twelve bits that it unloads from internal memory into, for example, four 8-PSK (phase shift keying) phases as is done conventionally for 8-PSK in general. For example, subgroups of three bits (also referred to herein as a data word) may be converted to 8-PSK using so-called Gray scale encoding such that the subgroup 0,0,0 is encoded as 0; 0,0,1 is encoded as $\pi/4$; 0,1,1 as $\pi/2$, and so on as illustrated by the following translation table.

| bits phase |
|---|
| 000:0 |
| 001:$\pi/4$ |
| 011:$\pi/2$ |

-continued

| bits | phase |
|---|---|
| 010: | $3\pi/4$ |
| 110: | $\pi$ |
| 111: | $5\pi/4$ |
| 101: | $6\pi/4$ |
| 100: | $7\pi/4$ |

Encoder circuit 30 associates the four subgroups of data bits of a group with a respective one of the constellation symbols $\phi_1$. That is, encoder 30 associates the first subgroup of three bits of a group of bits with the symbol $\phi_1$, and associates the next (second) subgroup of three bits with the symbol $\phi_2$, and so on. For example, assume that a group is composed of the following series of bits; 11101010001. The subgroup encoding and $\phi_i$ symbol associations based on the above translation table stored in memory would be as follows:

111:$5\pi/4$:$\phi_1$
110:$3\pi/4$:$\phi_2$
100:$7\pi/4$:$\phi_3$
001:$\pi/4$:$\phi_4$ Encoder circuit 30 then generates $\theta_1$ through $\theta_8$ in accord with the above transformations for $\theta_i$. For example, as indicated above $\theta_1=\phi_1+\phi_2+\phi_3+\phi_4$, then, for the present illustrative example, $\theta_1=5\pi/4+3\pi/4+7\pi/4+\pi/4$. Similarly, $\theta_2=5\pi/4+7\pi/4+\pi/4$; $\theta_3=5\pi/4+3\pi/4+\pi/4$; and so on. Note that the values of symbols $\phi_1$ through $\phi_4$ would be different for a subgroup having a different combination of twelve bits, e.g., 000101110011. However, note that symbol $\phi_1$, regardless of its value, is associated with the first subgroup of bits of a group, and symbol $\phi_4$ is associated with the last subgroup of bits of that group. When encoder circuit 30 has completed the generation of the eight phases $\theta_1$ through $\theta_8$, it then supplies the values for those phases to IFFT processor 40, which may be, for example, a conventional digital signal processor (DSP). Moreover, the DSP that implements the encoder 30 function may be programmed to also implement the IFFT 40 function. IFFT processor 40, more particularly, converts the data from the frequency domain to the time domain using the inverse of the Fast Fourier transform to generate respective phase vectors. Processor 40 then modulates a plurality, e.g., eight, digital carriers respectively using the values of the eight phase vectors formed by $\theta_1$ through $\theta_8$. That is, IFFT processor 40 modulates a carrier$_i$ (channel$_i$) using the value of a respective phase vector $\theta_i$. IFFT processor 40 then outputs the result to conventional digital to analog converter circuit 45, which converts the digital signals it receives from IFFT processor 40 to analog signals. The analog signals are then supplied to RF transmitter 50 which modulates the analog signals onto an RF carrier, e.g., a 5.2 GH$_3$ carrier, and supplies the result to antenna 55 for transmission to wireless type receivers, e.g., receiver 200. Encoder circuit 30 (OFDM transmitter 100) then goes on to similarly process the next the group of data bits stored in the aforementioned internal memory.

Figure 2:
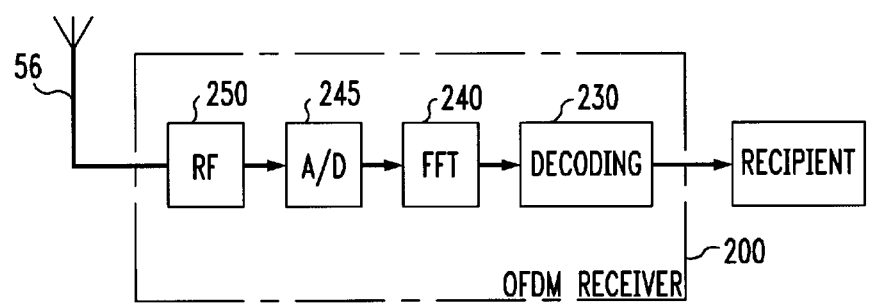
FIG. 2 illustrates in more detail the receiver of FIG. 1.

Receiver 200, FIG. 2, more particularly, includes a conventional RF section 230 for receiving the resulting composite signal via antenna 56 and processing (downconverting) the signal in a conventional manner as it is received. The processed result is then supplied to conventional analog to digital converter 245 which converts the processed result to corresponding digital signals. The digital signals are then supplied to Fast Fourier Transform (FFT) processor 240 which demodulates the N carriers. Processor 240 does this by performing a FFT on the digital signals supplied by converter 245. The output of FFT processor 240 comprises N (where N=eight for the present illustrative example) vectors (in-phase and quadrature samples), representing the amplitudes and phases of the N different subchannels, as illustrated by the following expression:

$$r_i = e^{j(5\pi/4+3\pi/4+7\pi/4+\pi/4)}, e^{j(5\pi/4+7\pi/4+\pi/4)}, e^{j(5\pi/4+3\pi/4+\pi/4)}, -e^{j(5\pi/4+\pi/4)},$$
$$e^{j(5\pi/4+3\pi/4+7\pi/4)}, e^{j(5\pi/4+7\pi/4)}, -e^{j(5\pi/4+3\pi/4)}, e^{j5\pi/4} \quad (2)$$

The N vectors are supplied to decoder 230 which then decodes the output of the FFT to determine the values of the respective phase symbols $\phi_1$. Such decoding, in accord with an aspect of the invention, is applied to alternating elements of the complementary code in which each of the complex odd samples of the FFT output is multiplied against a paired complex conjugate of the even samples. A summation of the result of each multiplication forms a vector which has the value of the sought-after phase angle (symbol $\phi_1$). This procedure may be followed for even and odd pairs of the samples as well as quads, etc. Decoder 230, more particularly and in accordance with this decoding technique, combines $r_i$ with a complex conjugate of the kernel code used to form the complementary code in the encoding of the group of data bits at the transmitter. One such kernel code may be, for example, {111-111-11}, as mentioned above. If that is the case, then $r_4$ and $r_7$ are inverted—meaning that the sign of the resulting multiplication for $r_4$ and $r_7$ is positive. (For notational purposes, the following equates the received digital signals (samples) with $x_i$, respectively.) Decoder 230 then generates three vectors $y_2$, $y_3$ and $y_4$ as a function of respective ones of the digital samples $x_i$.

More specifically, and as discussed above, transmitter 100 encodes phases $\phi_1$ to $\phi_4$ into eight phases $\theta_1$ through $\theta_8$ in accord with the aforementioned transformation. In addition, receiver 200 removes the effect of the kernel code on the received signal by multiplying the elements of vector $r_i$ by the kernel code and expressing the phase encoding in matrix form as follows:

$$\theta = A\phi$$

where $\theta$ and $\phi$ are vectors containing the values of the eight phases $\theta_i$ and four $\phi_i$ phases and A is an encoding matrix as follows:

$$A = \begin{bmatrix} 1 & 1 & 1 & 1 \\ 1 & 0 & 1 & 1 \\ 1 & 1 & 0 & 1 \\ 1 & 0 & 0 & 1 \\ 1 & 1 & 1 & 0 \\ 1 & 0 & 1 & 0 \\ 1 & 1 & 0 & 0 \\ 1 & 0 & 0 & 0 \end{bmatrix}$$

Using the matrix, receiver 200 may then determine the values of the encoded phases $\phi_i$ from the measured phases $\theta_1$ by determining a least-squares solution for the linear equations represented by the matrix as follows:

$$\phi = P\theta, P = A^T(AA^T) =$$

-continued
$$\frac{1}{4}\begin{bmatrix} -1 & 0 & 0 & 1 & 0 & 0 & 1 & 2 \\ 1 & -1 & 1 & -1 & 1 & -1 & 1 & -1 \\ 1 & 1 & -1 & -1 & 1 & 1 & -1 & -1 \\ 1 & 1 & 1 & 1 & -1 & -1 & -1 & -1 \end{bmatrix}$$

where P is the pseudo-inverse of A and superscript T denotes a matrix transpose. Unfortunately, such equations are not completely linear, since the phase values are modulo $2\pi$. Because of this, the above method cannot be applied directly to determining the values for $\phi_i$. However, an inspection of the A-matrix reveals that the phases $\phi_2$, $\phi_3$ and $\phi_4$ may be determined as a summation of 4 subtracted $\theta_i$ pairs, as mentioned above. For example, each of the subtractions $\theta_1-\theta_2$, $\theta_3-\theta_4$, $\theta_5-\theta_6$ and $\theta_7-\theta_8$ provide a value for $\phi_2$. A preferable way to get the phase difference between two vectors is to multiply one vector with the complex conjugate of the other vector. Doing so leads to the inventive decoding procedure in which the three vectors $y_2$, $y_3$, $y_4$ are determined as follows:

$$y_2 = x_1x^*_2 + x_3x^*_4 + x_5x^*_6 + x_7x^*_8$$

$$y_3 = x_1x^*_3 + x_2x^*_4 + x_5x^*_7 + x_6x^*_8$$

$$y_4 = x_1x^*_5 + x_2x^*_6 + x_3x^*_7 + x_4x^*_8$$

where * means complex conjugate and where the arctan of the angle between the real and imaginary parts of each term respectively forming vectors $y_2$ through $y_4$ provides the value of the corresponding phase symbol $\phi_2$ through $\phi_4$, respectively. (It is noted that the decoding technique used to derive the pairing of the elements forming each term of each of the above vectors may also be determined by inspection in which the difference between each pair of elements provides the value of the sought after phase angle.) For example, the value of vector $y_2$ is determined as follows for the instant illustrative example of the invention:

$$\begin{aligned} y_2 &= (e^{(5\pi/4+3\pi/4+7\pi/4+\pi/4)}e^{-j(5\pi/4+7\pi/4+\pi/4)}) + (e^{j(5\pi/4+3\pi/4+\pi/4)}) \\ & e^{-j(5\pi/4+\pi/4)}) + (e^{j(5\pi/4+3\pi/4+7\pi/4)}e^{-j(5\pi/4+7\pi/4)}) + (e^{j(5\pi/4+3\pi/4)}e^{-j5\pi/4}) \\ &= e^{3\pi/4} + e^{3\pi/4} + e^{3\pi/4} + e^{3\pi/4} \end{aligned}$$

A determination of the value of each term of vector $y_2$ thus leads to a determination of the phase value of $\phi_2$, which, for the present illustrative example is $3\pi/4$. In practice, the determination would be an estimate of $\phi_2$. Decoder 230 deals with that problem by "rounding off" the estimated value to the nearest constellation phase selected for the encoding at transmitter 30, e.g., 8-PSK constellation, to generate a more accurate value for $\phi_2$.

Decoder 230 then similarly generates phase estimates of $\phi_3$ and $\phi_4$ as a function of vectors $y_3$ and $y_4$, respectively, and "rounds off" those estimates in a similar manner. Doing so yields, in accord with the present illustrative example, phase values of $7\pi/4$ and $\pi/4$ for $\phi_3$ and $\phi_4$, respectively.

Once decoder 230 has determined the phase values of $\phi_2$, $\phi_3$ and $\phi_4$ it may then determine the value of $\phi_1$. However, note that the phase $\phi_1$ is present in all $\theta_i$ equations as illustrated by the above transformation table. Consequently, $\phi_1$ cannot be expressed as a subtraction of two $\phi_1$ values, as was done for the other phases. However, since all phases except for $\phi_1$ can be determined in the manner discussed above, then the values for those phases can simply be substituted in the $\theta_i$ equations to create eight equations with only one unknown as one way of obtaining eight estimates for $\phi_1$. Receiver 200 may then take the average value of the eight estimates for $\phi_1$ to improve the Signal-to-Noise Ratio (SNR) for $\phi_1$. It is noted that, in practice, the average may be based on only four of the estimated values, since the noise in the other four solutions is correlated with the noise in the solutions that are used.

Thus, a vector $y_1$ corresponding to the sought-after phase may be obtained by substituting the estimated values of the selected four solutions (phases) as follows:

$$\begin{aligned} y_1 &= x_4 e^{-j\phi_4} + x_6 e^{-j\phi_3} + x_7 e^{-j\phi_2} + x_8 \\ &= e^{j(5\pi/4+\pi/4)}e^{-\phi_4} + e^{j(5\pi/4+7\pi/4)}e^{-j\phi_3} + -e^{j(5\pi/4+3\pi/4)}e^{-j\phi_2} + e^{j5\pi/4} \\ &= e^{j5\pi/4} + e^{j5\pi/4} + e^{j5\pi/4} + e^{j5\pi/4} \end{aligned}$$

As was the case for $\phi_2$, the arctan of the real and imaginary part of each term of vector $y_1$ leads to a determination of the corresponding phase value of $\phi_1$, which, for the present illustrative example would turn out to be $5\pi/4$. Similarly, in practice, the determination would be an estimate of $\phi_1$ as was the case for $\phi_1$, $\phi_3$ and $\phi_4$. Accordingly, then, decoder 230 determines in a conventional manner the actual value of $\phi_1$ as a function of its estimated value, i.e., decoder 230 "rounds off" the estimated value to the nearest constellation phase selected for the encoding at transmitter 30, e.g., an 8-PSK constellation.

As a result of foregoing process, receiver decoder 230 determines the data values respectively represented by symbols $\phi_1$ through $\phi_4$. Namely, the series of bits 11101010001 assumed above for the present example illustrating of the principles of the invention.

As mentioned above, the pairing of the elements forming each term of each of the above vectors $y_i$ may be determined by inspection in which the difference between each such pair of elements provides the sought after phase angle. It is seen from the above, that each vector $y_i$ comprises a plurality of such terms. Advantageously, then, receiver 200 may still determine a sought-after phase even though one or more terms forming the associated vector $y_i$ were lost for whatever reason, e.g., due to a momentary change in the transmission environment. For example, assume that the first three channels are lost such that receiver 200 obtains only eight samples of the information transmitted by transmitter 100 as noted by the following:

$$r_i = 0, 0, 0, -e^{j((\phi_1+\phi_4))}, e^{j(\phi_1+\phi_2+\phi_3)}, e^{j(\phi_1+\phi_3)}, -e^{j(\phi_1+\phi_2)}, e^{j\phi_1}$$

As mentioned above, decoder 230 multiplies $r_i$ by the kernel code used in the decoding of the transmitted data at transmitter 100. Even though the first three channels were lost—meaning that the values of samples $x_1$ through $x_3$ would be zero—receiver 200, nevertheless, may still recover the values of phase symbols $\phi_1$ through $\phi_4$ from the samples that it is able to generate as illustrated by the following:

$$y_2 = x_5 x^*_6 + x_7 x^*_8 = \phi_2$$
$$y_3 = x_5 x^*_7 + x_6 x^*_8 = \phi_3$$
$$y_4 x_4 x^*_8 = \phi_4$$
$$y_1 = x_4 e^{-j\phi_4} + x_6 e^{-j\phi_3} + x_7 e^{-j\phi_2} + x_8$$

Advantageously, then, decoder 230, in accord with the principles of the invention, may still recover data that transmitter 100 transmits via a plurality of channels even though the content of one more of the channels is lost prior to being received by receiver 200.

The foregoing is merely illustrative of the principles of the invention. Those skilled in the art will be able to devise numerous arrangements, which, although not explicitly shown or described herein, nevertheless embody those principles that are within the spirit and scope of the invention. For example, although an illustrative embodiment of the invention was discussed in the context of a code of length 8, multiples of that number may be used in systems employing more than eight subchannels, e.g., sixteen subchannels. In such a system, several codes of length 8 may be interleaved to modulate the information transmitted over the channels. Such interleaving may be achieved by using one code for odd numbered channels and another code for even numbered channels. As another example, for a code length of $2^n$, there will be n+1 encoded phases $\phi_i$, which may be applied to the entire code or to alternating elements, quads, etc. Thus, the coding and decoding would be similar to the length 8 code, except for having a different number of phases $\phi_i$. As a further example, the use of complementary codes in accordance with the principles of the invention is also applicable to "forward error correction" as well as PAP reduction coding in OFDM systems. It is also possible to do fallback rates (decreased data rates with larger coverage) by increasing the code length (using length 16 or 32 codes instead of a length 8 code) or by decreasing the number of phases (e.g., using BPSK instead of 8-PSK).

We claim:

1. A method of encoding data for transmission to a receiver comprising the steps of selecting a kernel code formed from a predetermined number of bits and applying independent phase rotations, $\phi_i$, to each of said bits as a function of a predetermined transformation to generate respective complementary codes, $\theta_i$, associating a predetermined number of groups of stored bits with respective ones of said phase rotations, and converting the complementary codes into complex vectors, and modulating carrier signals using respective ones of said vectors and transmitting the result to a receiver.

2. The method of claim 1 wherein said transformation comprises a number of rows corresponding to the number of said independent phase rotations and a number of columns corresponding to said predetermined number of groups, and wherein said step of applying includes the step of applying the phase rotations forming said columns to respective ones of said bits to form said vectors.

3. The method of claim 1 wherein said step of associating includes the steps of encoding each of said groups of bits as respective phase angles in accordance with gray scale encoding and associating the encoded phase angles with predetermined ones of said phase rotations forming said complementary codes.

4. The method of claim 1 further comprising at said receiver the steps of receiving a composite signal of the modulated signals transmitted by said transmitter and regenerating individual ones of said vectors as a function of the received composite signal, applying said kernel code to said regenerated vectors, generating a number of vectors, $y_i$, from pairs of elements forming the regenerated vectors, in which one element in each of said pairs is taken as a complex conjugate so that said one element may be subtracted from the other element of the respective pair of elements, said pairing of said elements being performed in accordance with the contents of a predetermined matrix, deriving a respective one of said phase rotations as a function of each subtracted result forming a respective one of said vectors, $y_i$, said vectors, $y_i$, being associated with respective ones of said phase rotations, $\phi_i$, and deriving each phase rotation, $\phi_n$, not associated with a respective vector as a function of the derived phase rotations and a complementary code, $\theta_k$, formed in part by that phase rotation, $\phi_n$.

5. The method of claim 4 further comprising the steps of identifying the groups of bits respectively associated with the derived phase rotations.

6. A method of encoding data for transmission to a receiver, said method comprising the steps of encoding data words that are to be transmitted to said receiver into respective constellation symbols, generating a plurality of complementary codes as a function of a selected kernel code and a predetermined transformation matrix of said constellation symbols, and modulating a plurality of carrier signals with vectors representing respective ones of said complementary codes and transmitting said carrier signals to said receiver.

7. The method of claim 6 wherein said transformation matrix comprises a number of rows corresponding to the number of said constellation symbols and a number of columns corresponding to the number of said complementary codes.

8. The method of claim 7 wherein said step of encoding includes the steps of encoding each of said data words into respective phase angles in accordance with gray scale encoding and associating the encoded phase angles with predetermined ones of said constellation symbols.

9. The method of claim 7 further comprising at said receiver the steps of receiving a composite signal of the modulated carrier signals transmitted by said transmitter and regenerating individual ones of said vectors as a function of the received composite signal, applying said kernel code to said regenerated vectors to generate vector elements representing individual ones of said complementary codes, forming, in accordance with a predetermined encoding matrix, pairs of said elements and associating individual ones of said pairs with respective ones of said constellation symbols, in which one element in each of said pairs is taken as a complex conjugate so that said one element may be subtracted from the other element of the respective pair of elements, deriving individual ones of said constellation symbols as a function of the subtracted result obtained from the associated ones of said pairs of elements, and deriving each constellation symbol, $\phi_n$, not associated with any one of said pairs as a function of the derived constellation symbols and a complementary code, $\theta_k$, formed in part by that constellation symbol, $\phi_n$.

10. The method of claim 9 wherein said constellation symbols represent respective phase angles, and wherein said step of deriving as a function of the subtracted result includes the steps of determining an angle for each said subtracted result and associating the determined angle with that one of the phase angles that is closest to the determined angle to determine a respective one of the constellation symbols.

11. The method of claim 10 further comprising the step of identifying the data words respectively associated with the derived constellation symbols.

12. A transmitter for transmitting encoded data to a receiver, said transmitter comprising an encoder that encodes data words that are to be transmitted to said receiver into respective constellation symbols, a generator that generates a plurality of complementary codes as a function of a selected kernel code and a predetermined transformation matrix of said constellation symbols, and a modulator that modulates a plurality of carrier signals with vectors representing respective ones of said complementary codes and transmitting said carrier signals to said receiver.

13. A receiver for receiving encoded data from a transmitter, said receiver comprising apparatus that receives a composite signal of a plurality of signals transmitted by said transmitter and regenerating individual signal vectors as a function of the received composite signal, apparatus that applies a predetermined kernel code to said regenerated vectors to generate vector elements representing individual ones of said complementary codes, apparatus that forms, in accordance with a predetermined encoding matrix, pairs of said elements and associating individual ones of said pairs with respective ones of constellation symbols, in which one element in each of said pair is taken as a complex conjugate so that said one element may be subtracted from the other element of the respective pair of elements, apparatus that determines individual ones of said constellation symbols as a function of the subtracted result obtained from the associated ones of said pairs of elements, and apparatus that determines each constellation symbol, $\phi_n$, not associated with any one of said pairs as a function of the derived constellation symbols and a complementary code, $\theta_k$, formed in part by that constellation symbol, $\phi_n$.

* * * * *